FIP8102 OR 3,201,694

SEARCH ROOM

INVENTOR.
LEONARD R. KAHN
BY Mathis and Graybeal
ATTORNEYS

X Ph. mod

INVENTOR.
LEONARD R. KAHN
BY Mathis and Graybeal
ATTORNEYS

United States Patent Office 3,201,694
Patented Aug. 17, 1965

3,201,694

PHASE-NEUTRALIZED LIMITER, AND TRANSMITTER NEUTRALIZATION THEREWITH

Leonard R. Kahn, 81 S. Bergen Place, Freeport, N.Y.

Filed Dec. 14, 1961, Ser. No. 159,417
16 Claims. (Cl. 325—137)

The present invention relates to phase distortion neutralization in amplitude limiters and the like, and to test circuitry utilizing same for amplitude modulation transmitter neutralization. More particularly, the present invention provides an improvement for eliminating self-induced phase distortion in radio frequency signal transition circuitry involving change in envelope form, such as in an amplitude limiter, and to various applications thereof, such as for providing an accurate indication of transmitter neutralization as hereinafter specifically disclosed and claimed.

Amplitude limiters are used in many FM systems, and are also essential in a wide variety of other circuits. Such limiters in general function to eliminate the amplitude modulation from a radio frequency signal having both amplitude modulation and phase or frequency modulation (hereinafter simply referred to as phase modulation), in order to isolate the desired phase modulation component. Thus, simply by way of further example, single sideband generation of the so-called envelope elimination and restoration (EER) type as disclosed in my prior U.S. Patent 2,666,133, or of the so-called independent sideband (ISB) or double single sideband (DSB) type, as disclosed in my prior U.S. Patent 2,903,518, or of the so-called compatible single sideband (CSSB) type as disclosed in my prior U.S. Patent 2,989,707, all involve intermediate isolation of a phase modulated component of a single sideband wave, which isolation involves a limiting action to remove the amplitude modulated component from the phase modulated component of the signal modulation. Upon recombining of the phase modulation and amplitude modulation components in the modulated amplifier of a conventional amplitude modulation transmitter, a serious phase neutralization problem occurs which will be discussed more specifically below and clearly illustrates the nature of the problem resulting from what may be termed incidental, or self-induced, or limiter-induced phase modulation.

The problem essentially arises because to a greater or lesser degree all amplitude limiter circuits, and even some signal transition stages such as certain non-linear radio frequency amplifiers, introduce or induce phase modulation components in the modulated signal. In many cases, this self-induced phase modulation, or what is herein sometimes termed phase modulation distortion, is on the order of 20 to 25 db below the radio frequency energy level and is relatively worse at higher percentages of envelope modulation. It appears that the primary reason an amplitude limiter or the like self-induces phase modulation is that the input reactance of the limiter stages varies somewhat as a function of gain and is therefore a feedback factor reflecting variation in gain as variation in reactance, i.e. phase modulation. This effect occurs in both tube type and transistor type non-linear circuits.

When a variable amplitude wave is fed to a non-linear circuit, the non-linear circuit generally will have less gain for large amplitude signals than for low amplitude signals. When the non-linear circuit alters its phase characteristic, as well as its gain, then phase modulation is introduced. A primary object and purpose of the present invention is to provide means for reducing such phase modulation.

To neutralize the limiter-induced phase distortion generated inherently by a non-linear circuit, the present invention develops, from the amplitude modulation of the signal, a neutralizing phase modulation which is reactively impressed upon the signal input to the non-linear circuit and which is of proper amplitude and phase to annul or greatly attenuate the phase modulation induced in the signal in the non-linear circuit. Such pre-limiting phase distortion neutralization means, in the circuits therefore here disclosed, function in the output circuit of what may be termed a preliminary signal transition stage or pre-amplification stage, to vary the reactance of the preliminary stage output responsive to the amplitude of the amplitude modulated signal appearing in such output circuit so as to phase modulate such signal in a manner opposite to and substantially neutralizing the phase modulation induced by the limiter, the limiter output thereby being rendered free of incidental or induced phase distortion, or substantially so, without adverse effect on the desired phase modulation of the radio frequency wave.

In the specific circuits here disclosed, such phase distortion neutralization means in the output circuit of a pre-amplification stage or the like utilizes commercially available, solid-state capacitance means of the high Q, voltage variable type, such as certain semi-conductor diodes, which function as envelope detection means and output circuit reactance varying means. Such reactance varying means, being responsive only to voltage (i.e. envelope) variation of the applied radio frequency signal, are insensitive to phase modulation components of the radio frequency signal and do not distort any desired phase modulation previously impressed on the radio frequency signal.

In order to obviate the problems of self-induced phase distortion in amplitude limiters, and to provide an improved transmitter neutralization technique of advantageous operational utility and simplicity for use in conjunction with amplitude modulation type transmitters whether or not the transmitter output has a desired phase modulation component, the following description of certain typical embodiments of my invention are presented, together with the accompanying drawings, wherein.

Figure 1:
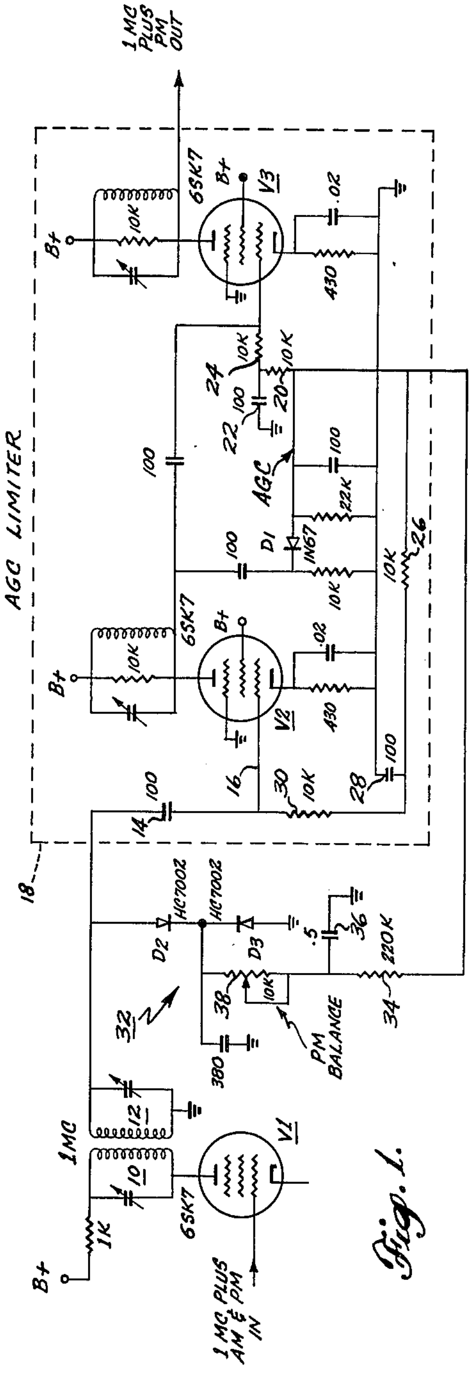
FIG. 1 is a simplified schematic of a fast-action automatic gain control (AGC) limiter and associated pre-amplification stage, with a typical phase distortion neutralization circuit in the output circuit of such pre-amplification stage.
Figure 3:
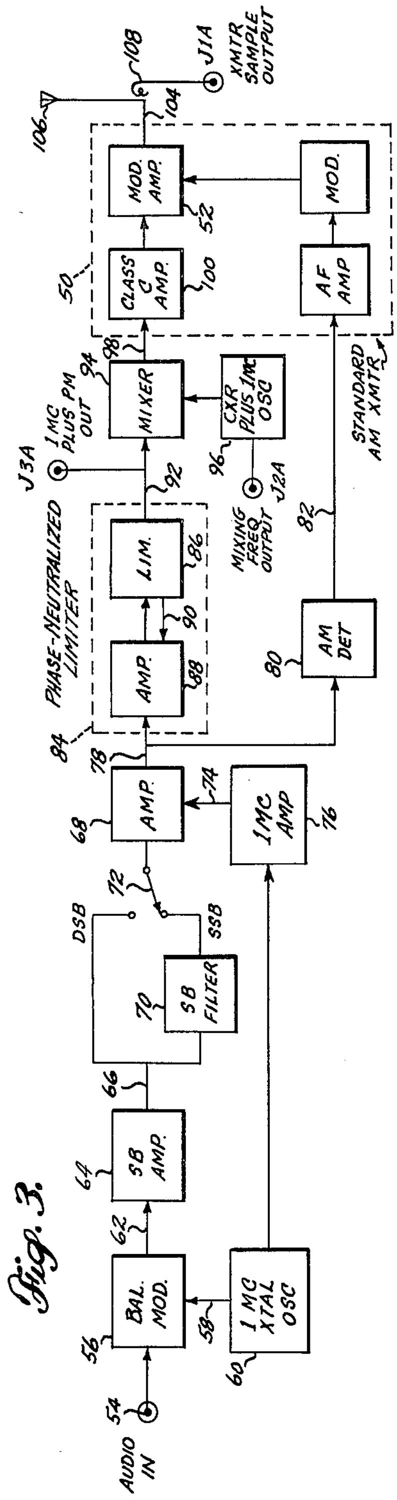
Figure 4:
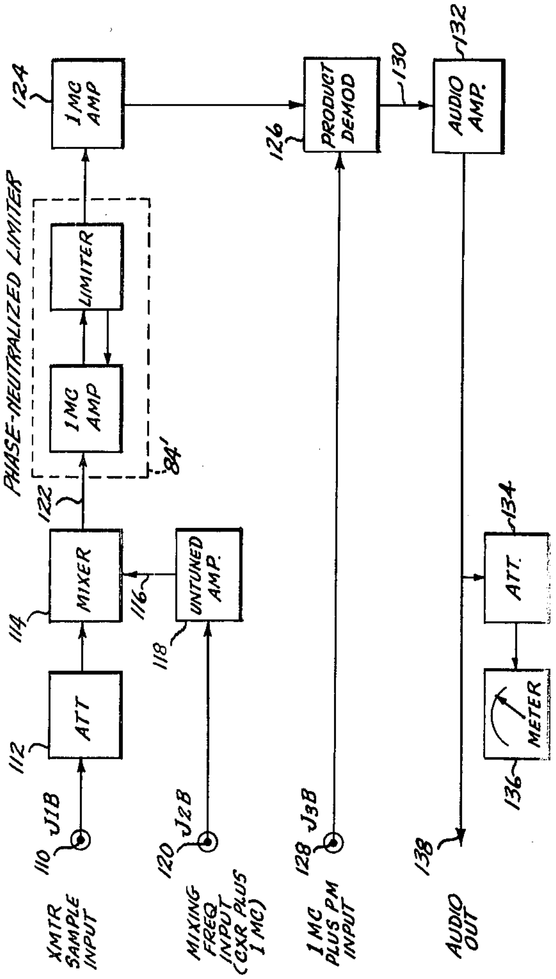

FIG. 3 is a block diagram of a typical transmitter system involving isolation of the amplitude modulated components and frequency modulated components of either a double sideband or a single sideband wave, such system including an adapter or exciter which incorporates a phase neutralized limiter circuit according to the present invention, the said adapter being employed in conjunction with a conventional transmitter of the amplitude modulation type involving a modulated amplifier as an output stage; and FIG. 4 is a block diagram of a neutralization test circuit incorporating the phase neutralization circuit of FIG. 1, as used in conjunction with the transmitter system shown at FIG. 3, for neutralization of the transmitter output.

In the phase-neutralized limiter circuit shown at FIG. 1, the preamplification stage includes an amplifier V1 receiving as an input a modulated radio frequency signal (1 mc. being selected by way of example) having both amplitude modulation and phase modulation components. The plate circuit of tube V1 includes a tuned circuit 10, to which is inductively coupled a tuned output circuit 12, which is in turn coupled by condenser 14 to the input control grid 16 of the first limiter stage V2.

The AGC limiter generally designated at 18 is illustratively a type known per se as a fast-acting AGC limiter, with two limiter stages comprising tubes V2 and V3. Each of said limiter stages is in effect a tuned amplifier with a fast-acting AGC voltage being developed in the output circuit of V2 by action of diode D1 and associated circuitry, an extremely short time constant being used in the load circuit of detector diode D1 so that the AGC response is fast enough to follow the signal envelope and remove the envelope modulation from the limiter input. As will be noted in FIG. 1, the AGC voltage developed at the plate of diode D1 is coupled to the control grid of the second limiter stage (tube V3) by resistor 20, condenser 22 and resistor 24, and is likewise coupled to the control grid of the first limiter stage (tube V2) by resistor 26, condenser 28 and resistor 30. Also, the AGC control voltage generated at the plate of diode D1 serves as a convenient source of bias voltage for the phase distortion neutralization circuit indicated generally at 32, being coupled thereto through a slow-acting RC circuit comprising resistor 34 and condenser 36, and a potentiometer 38 designated "PM balance" which serves as an adjustment for the extent of distortion compensating phase modulation of the signal wave input to the limiter, i.e. an adjustment of the extent of reactive variation impressed on the output signal in tank circuit 12 in the pre-amplification stage (tube V1) by the voltage variable capacitance and envelope detecting action of oppositely connected voltage variable semi-conductor diodes D2 and D3. As indicated, such voltage variable semi-conductor diodes are commercially available and known per se, such as silicon voltage variable capacitor Type HC7002, marketed by the Semiconductor Division of Hughes Aircraft Company, such as the silicon voltage variable capacitor marketed under the trademark "Varicap" by Pacific Semiconductors, Inc., and such as the voltage variable capacitor marketed under the trademark Semicap by International Rectifier Corporation.

In connection with the phase distortion neutralization circuit shown in FIG. 1, while the AGC control voltage appearing at the plate of the limiter AGC diode D1 is used as a source of voltage with a negative average value, such source in conjunction with the slow-acting RC circuit 34, 36 provides what is in effect simply a negative bias for diodes D2 and D3 which is at constant D.C. voltage, or substantially so. In other words, the reactive effect of the voltage variable diodes D2, D3 on the output circuit 12 of pre-amplification tube V1 occurs entirely as a result of the voltage responsive change in reactance of the D2, D3 network and associated circuitry, with the average extent of variation in reactance thus manifested being controlled by the bias level maintained at the innerconnection between diode D2 and diode D3, as determined by the setting of the PM balance control potentiometer 38.

Diodes D2 and D3 detect the audio envelope of the signal output of V1, with the result that a component of the current flowing through the diodes is at the audio envelope frequency so that their capacitance and consequently the reactance of the V1 output circuit is varied in relation to the signal envelope, producing phase modulation which compensates for the limiter induced phase modulation.

Figure 2:
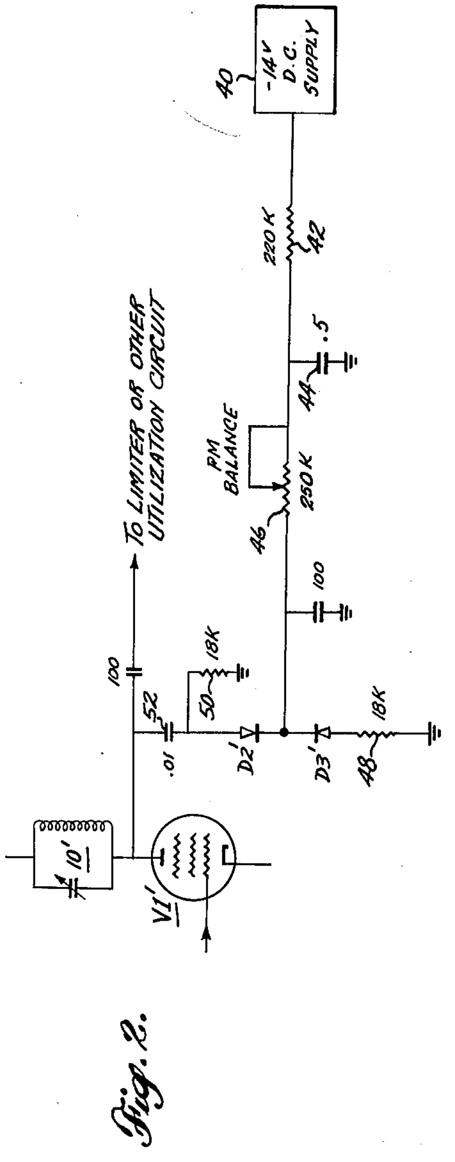
FIG. 2 illustrates by a simplified schematic a modified form of phase distortion neutralization circuit in a pre-amplifying output circuit.

As will be apparent, many circuit variations are possible with respect to the phase distortion neutralization circuit. Thus, by way of further illustrative example as shown in FIG. 2, the pre-amplification stage output circuit comprising tuned LC tank 10′ in the plate circuit of tube V1′ can be provided with phase distortion neutralization prior to going to a phase distortion inducing limiter or other utilization circuit. Specifically, in this circuit the envelope responsive variable reactance network involves oppositely connected voltage variable diodes D2′ and D3′ receiving negative bias from a negative voltage supply 40 coupled through resistor 42, condenser 44, and PM balanced control potentiometer 46 to the diode interconnection. Resistors 48 and 50 are ground returns for diodes D3′ and D2′, and coupling condenser 52 applies the variable capacitance generated by the circuit to the V1 output.

As will be observed, since the phase distortion neutralization circuit of FIG. 2 is completely independent of the limiter or other utilization circuit to which the signal is passed, and the phase distortion neutralization circuit shown in FIG. 1 can readily be similarly independent of the limiter providing separate negative bias is provided, the use of the neutralization circuit of the invention does not require usage of any particular type of limiter (such as the AGC limiter disclosed), or even as to any particular utilization circuit, such as a limiter.

Apparent also will be the fact that the phase distortion neutralization circuits shown at FIGS. 1 and 2 are very stable, and can be operationally regulated very simply, the extent of neutralization being variable simply by a bias adjustment (PM balance control 38 or 46).

In FIGS. 1 and 2, typical component values and types of components are designated, to further illustrate the nature of these circuits. As will be understood, such component characteristics and arrangement can be subject to wide variation, consistent with the basic purpose and manner of operation characteristic of the invention.

FIG. 3 presents a simplified block diagram of what is termed a Single Sideband/Double Sideband (SSB/DSB) Adapter or Exciter incorporating a phase-neutralized limiter according to the present invention, which adapter is used in conjunction with a conventional amplitude modulation transmitter generally designated at 50, involving a modulated amplifier 52 as an output stage, which modulated amplifier incorporates in a conventional manner a variable neutralization means (not shown). The essential circuitry and manner of operation of such an adapter have been disclosed in various patents and publications such as my prior U.S. Patents 2,666,133 and 2,989,707, and my articles in Proceedings IRE, vol. 40, No. 71, issue of July 1952, and Proceedings IRE, vol. 44, No. 12, issue of December 1956, for example, and reference should be made to such patents and publications for a more detailed discussion of the transmitter system shown at FIG. 3. It will suffice, for purposes of discussion of the present invention, to indicate that such a transmitter system adapted for envelope elimination and restortation (EER) type operation can involve delivering an audio signal input 54 to a balanced modulator 56 which also receives an input 58 from a radio frequency crystal oscillator 60, operating at a frequency of 1 mc. for example.

The output 62 from balanced modulator 56 is a double sideband, suppressed carrier wave which is amplified in sideband amplifier 64. The amplified output 66 from sideband amplifier 64 passes either directly to amplifier 68 or through sideband filter 70 to said amplifier 68, depending upon the position of switch 72, as determined by whether double sideband (DSB) or single sideband (SSB) operation is desired. Also, in amplifier 68, an input 74 from crystal oscillator 60 by way of amplifier 76 is mixed with the DSB or SSB signal, to provide a carrier related frequency in the output 78 from amplifier 68.

Said output 78 from amplifier 68 is then fed to an AM detector 80, the output 82 of which is fed to transmitter 50 as the audio input, and the said output 78 from amplifier 68 also passes to a phase-neutralized limiter generally designated at 84 which, in a manner characteristic of the present invention, comprises an AGC limiter 86 and a phase distortion neutralizing pre-amplification stage 88. Phase-neutralized limiter 84 can be constituted as schematically shown in FIG. 1, the negative bias derived from the AGC limiter circuit for the phase distortion neutralization circuit of pre-amplification stage 88 being diagrammatically designated at 90.

As will be understood, the output 92 from the phase-neutralized limiter 84 is a constant amplitude phase modulated radio frequency signal without substantial limiter-induced phase distortion. For test purposes, a sample of this output 92, as designated "1 mc. plus PM out" is obtainable at jack J3A. Such output 92 is mixed in mixer 94 with an input from oscillator 96 which in the example selected operates at the desired carrier frequency plus 1 mc. This unmodulated "Carrier plus 1 mc." frequency appears as a test output designated "Mixing Frequency Output," at jack J2A. The selected output 98 from mixer 94 is at the desired carrier frequency and is the carrier frequency input to transmitter 50, being there amplified as in one or more class C amplification stages generally designated at 100. The phase modulated carrier frequency is recombined with the audio frequency component representing the desired signal in modulated amplifier 52, the output 104 from which is transmitted by antenna 106. An inductive or similar pickup 108 samples the transmitted output and such "Transmitter Sample Output" appears for test purposes at jack 1A.

With respect to the following discussion of transmitter neutralization and test procedure in connection with FIG. 4, it is to be emphasized that the test procedure of the invention is applicable to any amplitude modulated transmitter system, whether or not involving an adapter for DSB or SSB modes such as shown at FIG. 3.

As will be understood in connection with FIG. 4, the proper neutralization of modulated amplifier 52 in transmitter 50, or the equivalent output stages in any amplitude modulated transmitter producing a carrier with both amplitude modulation and phase modulation components, can be operationally quite difficult, particularly when the operation of the transmitter should not be interrupted. A good discussion of conventional techniques for neutralizing amplitude modulation transmitters is found in the Gray et al. text entitled "Radio Transmitters," at pp. 71–72, as published by McGraw-Hill Company (1961).

To better understand the nature of this problem and the advantages of the neutralization technique discussed below in connection with the diagrammatic presentation thereof at FIG. 4, brief consideration will first be given of some of the necessities for optimum transmitter neutralization.

There are many reasons for neutralizing transmitters, the most commonly understood one being the requirement for stable operation without tendency for the transmitter output stage to oscillate. However, long before an output stage is closed to oscillation, poor neutralization may introduce serious operational problems. There is a prevalence of difficult mechanical procedures for transmitter neutralization. Controls are sometimes inaccessible unless power is removed from the transmitter and in some cases controls have backlash characteristics. When a perfectly neutralized stage is amplitude modulated by a perfectly sinusoidal signal, a single upper sideband component and single lower component is generated. If this stage is poorly neutralized, however, other components are formed by feedback. If the phase of the feedback voltage is at 90° in respect to the grid drive of the output stage, or if the grid is saturated or a sufficient negative envelope feedback is present, the undesired feedback voltages do not introduce appreciable envelope distortion but the energy spectrum is increased in its number of components. Because no appreciable envelope distortion is produced, however, measurement of the transmitted envelope may indicate the transmitter is properly modulated, yet the bandwidth of the signal would actually be seriously increased because of the phase distortion.

Such self-induced phase modulation problem was known in the early days of radio engineering, but apparently has not been given serious consideration in recent years. Not only is it a serious problem with respect to transmitting a carrier with a desired combination of amplitude modulation and frequency modulation, but interference during fading conditions such as caused by ionospheric disturbances is more serious with respect to a phase distorted signal than with respect to a properly neutralized signal. Also, in some specialized service when an amplitude modulated transmitter is being received by a single sideband receiver having a product demodulator, the second order sideband generator of the single sideband receiver can cause excessive distortion if the transmitted signal is distorted in phase.

For all of these reasons, as well as for better efficiency and tube life, careful neutralization of the transmitter output stage is extremely important.

To provide proper transmitter neutralization with respect to the transmitter system presented by FIG. 3, for example, the neutralization test circuitry diagrammed at FIG. 4 involves an input 110 from jack J1A to jack J1B to provide a sample of the transmitter output energy. Such energy is suitably attenuated if necessary in attenuator 112, then mixed in mixer 114 with a mixing frequency input 116 by way of untuned amplifier 118 and an input 120 from output jack J2A to jack J2B. In the example selected, such mixing frequency is the frequency generated by oscillator 96, which is the radiated carrier frequency plus 1 mc.

In mixer 114, the difference frequency output 122 therefrom is 1 mc., modulated both in amplitude and phase with all of the carrier modulation appearing in the transmitter output. Such 1 mc. plus AM and PM output 122 is passed to phase-neutralized limiter 84′, which can be identical to phase neutralized limiter 84 of the adapter shown in FIG. 3 if desired, thence to 1 mc. amplifier 124 and product demodulator 126 where an input 128 from jack J3A of FIG. 3 by way of jack J3B of the test unit produces an audio output 130 which is in turn amplified in audio amplifier 132 and delivered through attenuator 134 to a suitable neutralization indicator such as meter 136 and also delivered as an audio output 138 from the test unit, if desired, as for audible monitoring or remote indication.

As indicated, the output 122 from mixer 114 in the test circuit shown at FIG. 4 has a frequency spectrum centered at 1 mc., with both amplitude modulation and phase modulation components, the phase modulation components including whatever phase distortion may be occurring in the output stages of transmitter 50. This signal, representing transmitter output energy characteristics, has the amplitude modulation thereof removed in phase-neutralized limiter 84′, without introduction of additional phase modulation distortion. Then, in product demodulator 126, a comparison signal input sampled from the output 92 from phase-neutralized limiter 84 of the Adapter provides in the output 130 from product demodulator 26 an audio signal representing any difference in phase modulation between the phase modulation occurring at the output of phase-neutralized limiter 84′ and occurring at the output of phase-neutralized limiter 84, i.e. such audio output 130 reflects only phase modulation distortion which has occurred in the transmitter 50 and is independent of the desired phase modulation in the transmitted signal, since such has been canceled in product demodulator 126. Thus, by adjustment of the variable neutralization means available in the transmitter to reflect minimum audio output at meter 136 or audio output 138, an optimum neutralization of the transmitter is realized.

Of considerable operational importance with respect to this transmitter neutralization procedure is the fact that such can be accomplished with the transmitter in operation, and the neutralization can be readily monitored on a continuous or intermittent basis without detriment to transmitter operation.

From the foregoing discussion of exemplary envelope responsive variable reactance means for neutralizing self-induced phase modulation in limiter and like circuits, and the discussion of the principles involved with respect to accurate transmitter utilization by use of such circuits, various further applications, modes of utilization, and operational procedures, as well as further features and advantages characteristic of the invention, will occur to those skilled in the arts to which the invention is addressed, within the scope of the following claims.

What is claimed is:

1. Electronic circuitry comprising:

(a) radio frequency signal limiter means producing from an amplitude and phase modulated signal input a substantially constant amplitude, phase modulated signal output;

(b) a signal passing circuit through which the amplitude and phase modulated radio frequency signal passes prior to appearing as an input to said signal limiter means; and (c) signal envelope responsive variable reactance means in said signal passing circuit varying the reactance thereof responsive to the envelope of the amplitude and phase modulated signal and phase modulating said signal in said signal passing circuit to substantially neutralize the phase modulation induced in the signal by said signal limiter means without substantial change in the phase modulation of the signal.

2. Circuitry according to claim 1, wherein said signal envelope responsive variable reactance means comprises a plurality of oppositely connected signal envelope responsive devices of the voltage variable capacitance type.

3. In a single sideband transmission system, means generating a single sideband wave, and means isolating and amplitude limiting the phase modulation component of the single sideband wave, such amplitude limiting means comprising limiter means and signal envelope responsive variable reactance means according to claim 1.

4. Phase-neutralized limiter circuitry generating from an amplitude and phase modulated radio frequency signal an output signal having a constant amplitude substantially with the initial phase modulation but substantially without limiter-induced phase modulation, said circuitry comprising:

(a) signal limiting means;

(b) a fast-acting automatic gain control circuit constituting a part of and regulating the gain of said limiting means so as to provide a phase modulated output therefrom of substantially constant amplitude;

(c) a signal transition stage preliminary to said signal limiting means through which the amplitude and phase modulated radio frequency signal passes prior to appearing as an input to said automatic gain control circuit; and (d) variable reactance means in said signal transition stage varying the reactance thereof responsive to the envelope of the amplitude and phase modulated signal and phase modulating said signal in a manner attenuating the phase modulation of the signal induced by said signal limiting means but not substantially attenuating the initial phase modulation thereof.

5. Amplitude limiter circuitry according to claim 4, wherein said variable reactance means comprises:

(a) a negatively biased network including a plurality of high Q, oppositely connected semi-conductor devices of the voltage variable capacitance type, serving as diode detectors to detect input signal envelope variations and introduce to the signal input to the limiting means a reactance factor which is a function of the envelope of the amplitude modulated input signal.

6. In a single sideband exciter:

(a) means generating a single sideband wave having amplitude and phase modulated components, and (b) means isolating and amplitude limiting the phase modulation component of the single sideband wave without self-induced phase modulation, such amplitude limiting means comprising a signal transition stage and signal limiting means according to claim 4.

7. Phase-neutralized limiter circuitry receiving as an input an amplitude and phase modulated radio frequency signal and generating as an output a constant amplitude signal with essentially the initial phase modulation but without any limiter-induced phase modulation appearing in the output signal, said circuitry comprising:

(a) a pre-amplification stage;

(b) a plurality of signal limiting stages following said pre-amplification stage, producing a constant amplitude, phase modulated output; and (c) phase distortion neutralization means in the output circuit of said pre-amplification stage varying the reactance of the said pre-amplification stage output responsive to the amplitude envelope of the amplitude and phase modulated signal so as to phase modulate said input signal in a manner opposite to the phase modulation induced in the signal by the signal limiting stages and thereby neutralize such induced phase modulation without substantial change in the initial phase modulation of the signal.

8. Electronic circuitry receiving as an input an amplitude modulated and phase modulated radio frequency signal and generating as an output an amplitude limited, phase modulated signal, said circuitry being adapted to neutralize any limiter-induced phase modulation without distorting the desired phase modulation of the input signal, said circuitry comprising:

(a) limiter means producing such constant amplitude, phase modulated output;

(b) a signal transition stage whose output is received as an input to said limiter means; and (c) phase distortion neutralization means including capacitance means of the voltage variable type in said signal transition stage for varying the reactance of the said input circuit responsive to the amplitude level of said stage so as to phase modulate said signal in a manner substantially canceling therefrom the phase modulation induced by said limiter means while not distorting the desired phase modulation of the signal.

9. Electronic circuitry receiving as an input an amplitude modulated and phase modulated radio frequency signal and generating as an output an amplitude limited, phase modulated signal, said circuitry being adapted to neutralize any limiter-induced phase modulation without distorting the desired phase modulation of the input signal, and comprising:

(a) limiter means including a plurality of amplification stages and a fast-acting automatic gain control circuit regulating the gain of said stages so as to provide a constant amplitude output;

(b) a tuned pre-amplification stage whose output is received as an input to said limiter means; and (c) phase distortion neutralization means including capacitance means of the high Q, voltage variable type in the output circuit of said pre-amplification stage and deriving negative bias from said automatic gain control circuit for varying the reactance of the said pre-amplification stage responsive to the amplitude level of the input signal so as to phase modulate said signal in a manner substantially canceling therefrom the phase modulation induced by said limiter means.

10. In combination with a transmitter having an output amplification stage with variable neutralization means and providing an amplitude modulated radio frequency output:

(a) a transmitter neutralization indication circuit comprising means deriving a sample representative of the modulation components of the transmitter output wave;
(b) means limiting the amplitude of such output sample;
(c) means deriving a sample representative of the carrier wave without any transmitter-induced amplitude modulation thereof;
(d) means product demodulating the limited output wave sample with said carrier wave sample and providing an audio frequency output representative of any phase modulation distortion between said output wave and said carrier wave; and
(e) means indicating said audio frequency output so that by adjustment of the variable neutralization means in the transmitter the output thereof can be neutralized to the point of minimum audio output in said neutralization indication circuit.

11. In combination with a transmitter having an output amplification stage with variable neutralization means and providing a carrier wave output which is amplitude modulated and phase modulated responsive to a desired signal; a neutralization test circuit comprising:

(a) means deriving a sample representative of the amplitude modulated and phase modulated transmitter output wave;
(b) limiter means with phase distortion neutralization to limit such output wave sample and produce a constant amplitude wave with the desired phase modulation and with any incidental, transmitter-induced phase modulation;
(c) means deriving a constant amplitude sample representative of the carrier wave and with only the desired, signal-related phase modulation;
(d) means product demodulating said limited output wave sample with said modulated carrier wave sample; and
(e) means sensing the level of an audio output from such product demodulation means, whereby the output amplification stage of said transmitter can be neutralized to minimize the transmitter-induced phase modulation by variation of its variable neutralization means to reflect minimum audio output in said neutralization test circuit.

12. Test circuitry for neutralizing an amplitude modulated transmitter having an output amplification stage with variable neutralization means, said circuitry comprising:

(a) means deriving a sample representative of the amplitude modulated energy appearing as transmitter output;
(b) means limiting the amplitude of such output energy sample by a limiter circuit providing a constant amplitude wave output without self-induced phase distortion;
(c) means product demodulating the limited output wave sample with a sample representative of a constant amplitude wave which has not passed through the output amplification stage of said transmitter;
(d) means deriving from such product demodulation an audio output related to the transmitter-induced phase modulation in said transmitter output energy, whereby the neutralization means of said transmitter can be varied to minimize such audio output and thereby obtain optimum transmitter neutralization.

13. The method of neutralizing an amplitude modulated transmitter having an output amplification stage with variable neutralization means and providing an amplitude and phase modulated carrier wave, said method comprising:

(a) deriving a sample of the amplitude and phase modulated radio wave energy appearing as transmitter output;
(b) limiting the amplitude, phase modulated of such output energy sample by limiter circuitry providing a constant amplitude, phase modulated output without limiter-induced phase distortion;
(c) product demodulating the limited output wave sample with a constant amplitude sample representative of the phase modulated carrier wave which has not passed through the output amplification stage of said transmitter;
(d) deriving from such product demodulation an audio output related to the transmitter-induced phase modulation in said transmitter output energy, and
(e) varying the neutralization means of said transmitter to minimize such audio output.

14. The method of neutralizing a transmitter having an output amplification stage with variable neutralization means and providing a carrier wave output which is amplitude modulated and phase modulated responsive to a desired signal; said neutralization method comprising:

(a) deriving a sample representative of the amplitude modulated and phase modulated transmitter output wave;
(b) limiting such output wave sample and producing a constant amplitude wave with the desired phase modulation and with any incidental, transmitter-induced phase modulation;
(c) deriving a constant amplitude sample representative of the carrier wave and with only the desired, signal-related phase modulation;
(d) product demodulating said limited output wave sample with said modulated carrier wave sample;
(e) sensing the level of an audio output from such product demodulation means; and
(f) minimizing the transmitter-induced phase modulation in the transmitter output by varying its variable neutralization means to reflect minimum audio output from such product demodulation means.

15. The method of neutralizing an amplitude modulated transmitter transmitting a carrier which is amplitude modulated and phase modulated with signal intelligence, said method comprising:

(a) limiting a phase modulated sample representative of the energy appearing as transmitter output;
(b) product demodulating the limited, phase modulated output wave with a constant amplitude sample representative of the phase modulated carrier wave which has not passed through the output amplification stage of said transmitter;
(c) deriving from such product demodulation an audio output related to the transmitter-induced phase modulation of the transmitter output energy, and
(d) adjusting said transmitter to minimize such audio output.

16. The method of neutralizing an amplitude modulated transmitter transmitting a carrier which is amplitude modulated and phase modulated with signal intelligence, said method comprising:

(a) limiting a sample representative of the amplitude and phase modulated radio wave energy appearing as transmitter output to provide a constant amplitude, phase modulated wave;

(b) product demodulating such constant amplitude, phase modulated wave with a sample representative of the phase modulation of said carrier wave prior to amplitude modulation thereof in said transmitter;

(c) deriving from such product demodulation an output related to the transmitter-induced phase modulation in said transmitter output energy, and (d) varying the neutralization of said transmitter to minimize such derived output.

References Cited by the Examiner

UNITED STATES PATENTS

| | | | |
|---|---|---|---|
| 2,186,958 | 1/40 | Collins | 332—37 |
| 2,298,930 | 10/42 | Decino | 325—184 |
| 2,956,234 | 10/60 | Olsen | 331—36 |
| 3,038,072 | 6/62 | Proudfit | 307—88.5 |

FOREIGN PATENTS

| | | |
|---|---|---|
| 535,189 | 1/57 | Canada. |

DAVID G. REDINBAUGH, *Primary Examiner.*